KIYOSHI INOUE
INVENTOR.

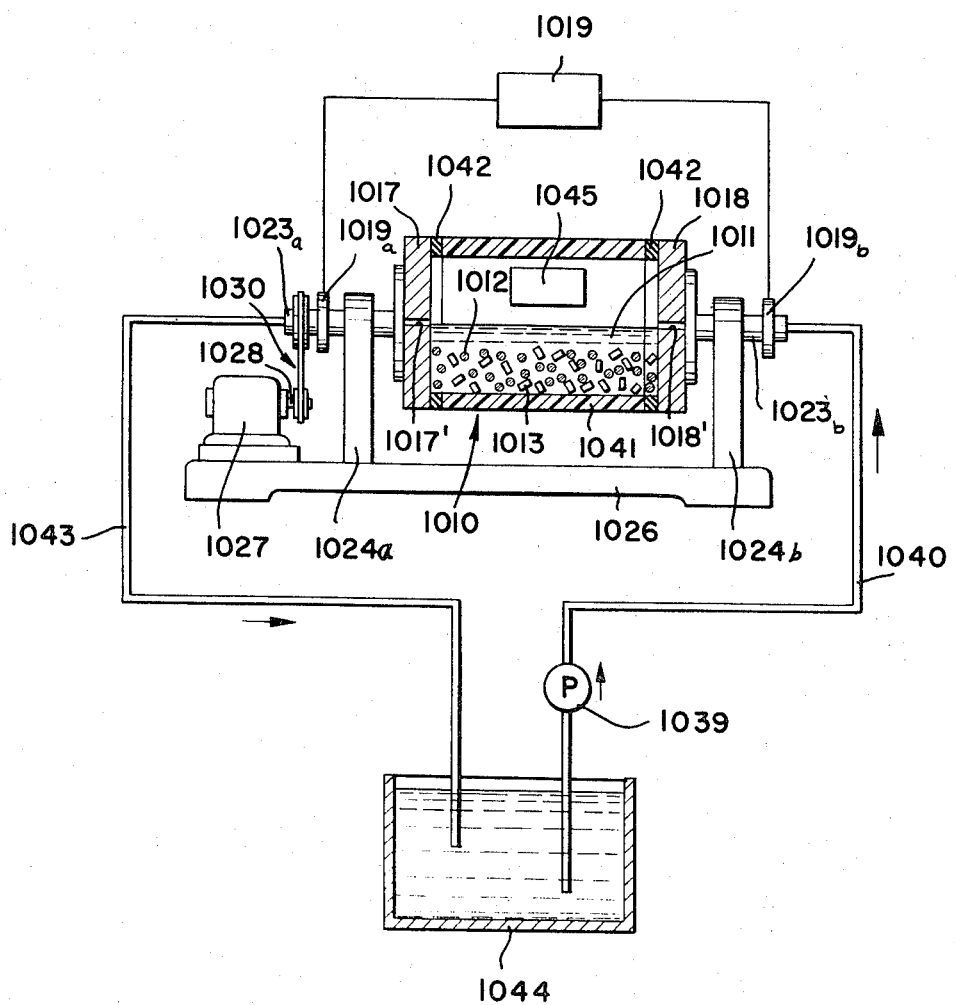

Karl J. Ross
Attorney

KIYOSHI INOUE
INVENTOR.

BY Karl F. Ross
ATTORNEY

Dec. 4, 1973     KIYOSHI INOUE     3,776,827
METHOD OF DEBURRING WORKPIECES
Filed Feb. 25, 1971     13 Sheets-Sheet 13
FIG. 24
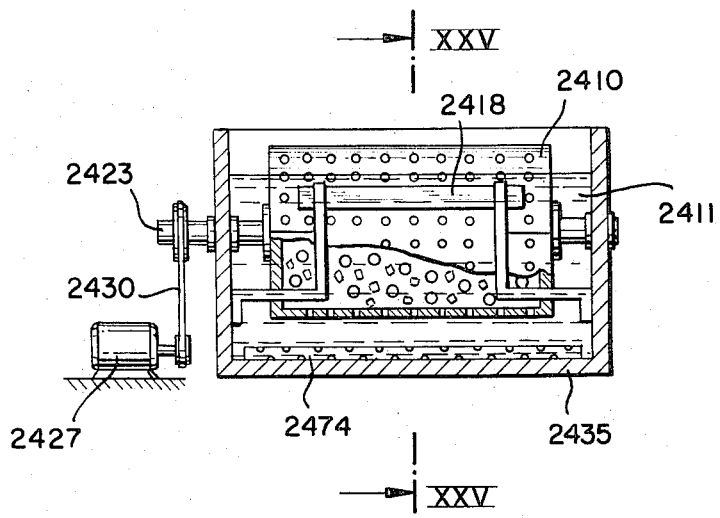
FIG. 26
FIG. 25
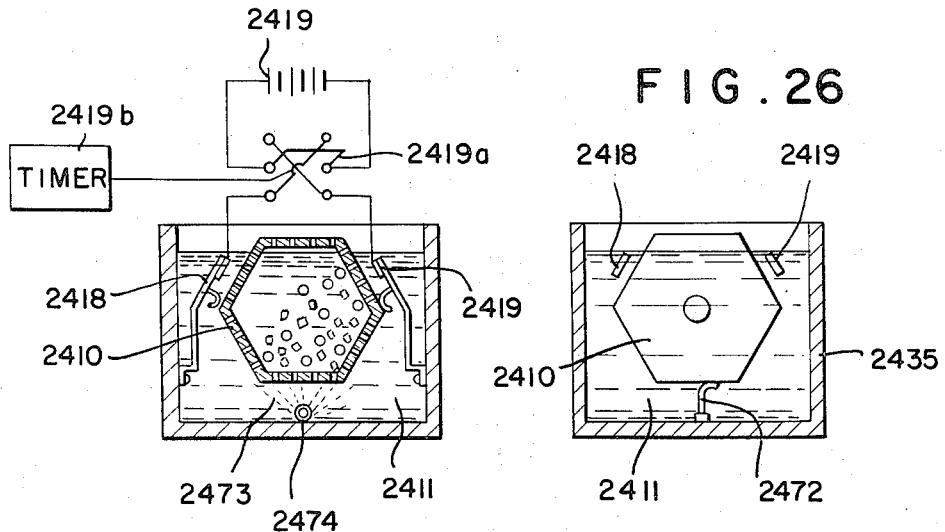
KIYOSHI INOUE
*INVENTOR.*
BY
*Karl F. Ross*
ATTORNEY

United States Patent Office 3,776,827
Patented Dec. 4, 1973

3,776,827
METHOD OF DEBURRING WORKPIECES
Kiyoshi Inoue, 16-8 3-chome, Kamiyoga, Setagaya-ku,
Tokyo, Japan
Continuation-in-part of application Ser. No. 714,252,
Mar. 19, 1968, now Patent No. 3,620,953, which is a
continuation-in-part of application Ser. No. 598,391,
Dec. 1, 1966, now abandoned, and a continuation of
application Ser. No. 859,532, Apr. 21, 1969, now
Patent No. 3,533,928. This application Feb. 25, 1971,
Ser. No. 118,725
The portion of the term of the patent subsequent to
Oct. 13, 1987, has been disclaimed
Int. Cl. B23p 1/00; C23b 5/78
U.S. Cl. 204—129.46                      16 Claims

ABSTRACT OF THE DISCLOSURE

Apparatus for the electrochemical deburring of metallic workpieces in which a drum or endless band forms a continuously displaceable surface for the workpieces which, together with carbon particles and/or other abrasive particles, are agitated in an electrolyte. The drum is rotated about its horizontal axis while a pair of disks form electrodes closing the drum. When the endless belt is used, it then passes into a vessel retaining the electrolyte and thereafter carrying the workpieces to a collecting trough while carbon particles are continuously added or removed from the system whose electrodes are connected in pairs to respective phases of the power supply.

(1) CROSS REFERENCE TO EARLIER APPLICATIONS

This application is a continuation-in-part of copending application Ser. No. 714,252, filed Mar. 19, 1968 (now Pat. No. 3,620,953), as a continuation-in-part of then pending application Ser. No. 598,391, filed Dec. 1, 1966, now abandoned and replaced by continuation application Ser. No. 859,532, filed Apr. 21, 1969, now U.S. Pat. No. 3,533,928, issued Oct. 13, 1970.

(2) FIELD OF THE INVENTION

My present invention relates to a method of and an apparatus for the deburring of metallic and other conductive workpieces whereby surface irregularities of such workpieces can be eliminated.

(3) BACKGROUND OF THE INVENTION

Deburring apparatus of several types are commonly in use in the metal-working field, primarily for the removal of surface irregularities in cast, machined and molded metallic workpieces. For the most part, such apparatus includes a tumbling drum provided with agitating means for repeatedly casting the workpieces, generally in a liquid vehicle and sometimes in the presence of an abrasive, into contact with one another, against the walls of the vessel or drum or into contact with other bodies (e.g. of abrasive material) mixed with the charge in the drum. This tumbling action mechanically dislodges adherent materials while rounding off irregular portions and projections integral with the metallic bodies. These systems, however, are relatively slow and even defective when the deburring operation is to remove substantial amounts of material.

(4) OBJECTS OF THE INVENTION

It is, therefore, the principal object of the present invention to extend principles originally set forth in the above-identified copending application and to provide a method of deburring metal workpieces whereby the rate of material removal and the surface finish of the treated objects is significantly increased and improved.

Another object of this invention is to provide a relatively simple and inexpensive apparatus for a high rate deburring of metallic workpieces while yielding a relatively high quality surface finish.

Yet another object of this invention is to provide a method of and an apparatus for the deburring of relatively large-dimension workpieces of such nature that tumbling may be impractical.

(5) SUMMARY OF THE INVENTION

These objects and other which will become apparent hereinafter are attained, in accordance with the present invention, by a method of deburring metallic workpieces in which the liquid vehicle is agitated in contact with the workpiece to be deburred while mechanical contact between the surfaces of the latter and at least some other bodies is carried out concurrently with an electrochemical material-removal step.

As set forth in application Ser. No. 598,391, which eventually matured into U.S. Pat. 3,533,928, I have found, surprisingly, that electrochemical techniques hitherto used primarily for the electrochemical machining (ECM) and electrochemical grinding (ECG) of metallic bodies, wherein close tolerances are a necessity, can be used effectively in conjunction with a tumbling or agitating operation to debur metallic workpieces or objects having electrolytically soluble surface portions. The surprising nature of this discovery will become all the more apparent when it is recognized that the present method does not require a stationary electrode urged against the workpiece or juxtaposed therewith via a predetermined machining gap.

In accordance with the principal feature of this invention, an electrochemical machining current, which may be direct or periodic (e.g. raw-rectified alternating current, pulsating direct current and ordinary AC) is passed through the liquid vehicle which is constituted as an electrolyte and may contain abrasive particles or merely additional bodies to facilitate mechanical deburring of the workpieces concurrently with the electrochemical action. While, in some cases, the workpiece may be stationary and is connected with a pole of the electrochemical machining sources, I have found that it is not necessary to connect the workpieces directly thereto, and that the mere tumbling of such workpieces in an electrolyte and in a drum having spaced-apart contact portions bridged by the electrolyte but not shortcircuited by the drum itself, can effect electrochemical removal of material from the workpiece surfaces.

While I do not wish to be bound by any theory in this regard and the precise reasons why the current flow through the electrolyte is effective to remove material from the surfaces of the conductive workpieces are not yet clear, it may be hypothesized that each of the workpieces acts as an electrode for the machining of others or as objects undergoing electrolytic erosion against other conductive bodies. Since electrolytic oxidation of the workpiece at its surface is essentially nonreversible in the sense that agitation and mechanical action of the electrolyte carries away the oxide film as soon as it is formed and, even upon electrical (polarity) reversal, metal is not materially redeposited from the oxide onto the machine surface, the electrolytic action is carried out as if a wire were directly connected to each workpiece.

According to a more specific feature of this invention, the agitation of a multiplicity of workpieces is effected in a tumbling drum which may be provided at its base with one electrode portion and with a second contact or electrode, at a location spaced therefrom but in contact with the electrolyte, the electrodes being connected across an AC or DC electrochemical-machining source, e.g. of the type described and illustrated in any of the applications Ser. No. 512,338 (U.S. Pat. No. 3,475,312), Ser. No. 535,268 (U.S. Pat. No. 3,417,006), Ser. No. 562,857 (U.S. Pat. No. 3,420,759), filed Dec. 8, 1965, Jan. 19, 1966 and July 5, 1966, respectively, all of which were pending at the time the parent application was filed. The tumbling drum can be upwardly open and rotatable about an axis tilted upwardly at an angle of, say, 30 degrees from the horizontal. In this case, the agitation is effected purely by rotation of the drum.

I have also found it to be possible, in conjunction with such a tumbling drum, or when a stationary vessel is employed, to effect the agitation at least in part by magnetic means. Thus, if the workpieces treated in the deburring operation or the other bodies involved are magnetically permeable, I apply a magnetic field to them so as to effect their displacement in the electrolyte; I also may distribute in the deburring vessel among the workpieces particles or bodies of a magnetically permeable material. Such bodies may be abrasive or electrically conductive to facilitate electrochemical erosion of the workpieces or produce the friction necessary for the deburring action. In fact, the particles or bodies serving as the agitating means need not be magnetically permeable under some circumstances, since the particles in the electrolyte tend to respond to a rapidly changing magnetic field by rotating about the axis thereof. Thus, agitation may be promoted with the aid of conductive as well as magnetically permeable particles. According to still another feature of this aspect of the invention, the particles which are magnetically or electrically displaceable in the liquid vehicle, can be coated with abrasive material, incorporated in or mixed with abrasive particles which are not influenced by an electromagnetic field.

Preference is given, in accordance with this invention, to pulsating or alternating electromagnetic fields for controlling the movement of particles and inducing electrochemical erosion of the workpiece surfaces since purely direct current has a tendency to produce agglomeration of magnetic particles in the deburring vessel.

According to another aspect of the basic concept, the agitation is carried out by rotating an electrode immersed in the electrolyte by, for example, rotating an electrode member in an irregular die cavity to deburr the machined surfaces thereof. Abrasive particles are here included in the deburring vehicle while an eltctrolytic machining current is applied between the workpiece and this rotating element. In asmuch as this electrode member is not closely juxtaposed with the workpiece surface and is rotated relatively rapidly, a more or less uniform surfacing is effected. In accordance with this aspect of the invention, I prefer to incorporate in the vehicle a multiplicity of conductive particles which here act as intermediate electrodes and as they are dispersed by the agitation into the rotation of the die surfaces, each particle acts as an individual electrode to facilitate smoothing of the die surface. The rotary electrode member imparts a centrifugal forces to the abrasive and conductive particles contained within the electrolyte so that these particles are dynamically urged outwardly and forcefully brought into contact or close juxtaposition with the surfaces to be treated to augment the resulting mechanical deburring action.

According to yet another aspect of this invention, deburring is carried out as augmented by a magnetic-field pressure which, when combined with the dynamic flow of rapidly moving particles, with the centrifugal force of tumbling or electrolyte displacement by a stirrer and with gravitational forces, magnetically urges the abrasive bodies against the workpieces and the workpieces against one another. This magnetic field pressure is, advantageously, supplied by electromagnetic means disposed externally of the deburring vessel and capable of applying inward magnetic forces to the magnetically permeable particles and workpieces. When the abrasive particles or auxiliary bodies serving to facilitate mechanical removal of irregularities and projections upon the workpieces are magnetically permeable and/or the workpieces are of such permeability, a high frequency magnetic field applied from without, in accordance with this invention, induces an oscillation and/or a magnetostrictive expansion and contraction of the bodies so that the simple tumbling action is accompanied by a magnetic vibration or pulsation of the body to improve the erosive operation. In this connection it can also be stated that the field may be of such nature that vibration of the individual particles by the magnetic field is coupled with a tumbling action of a rotary drum or a vibration thereof to increase the mechanical abrasion.

Another feature of this invention resides in the use of chemical action in removing surface irregularities in combination with the electrochemical and mechanical deburring action as described above. Thus I have found that surprisingly effective results can be obtained when a chemical mordant or etchant for the workpiece material is incorporated in the electrolyte. For as yet unknown reasons, the surface finish and deburring rate obtained when, for example, ferric chloride is used as the chemical etchant in the electrolyte, is better than that which would be expected with either the etchant or the electrochemical action alone, while the rate of material removal exceeds the sum predictable from the individual actions of the etchant and the electrochemical erosion.

According to a further feature of the present invention, the electrochemical deburring of metallic workpieces is carried out concurrently with agitation of the bodies in an electrically nonconductive tumbling drum rotatable about a recumbent axis (preferably horizontal or near horizontal) containing liquid electrolyte and the conductive (i.e. carbon) particles, together with the workpieces as described therein. A pair of electrodes are in constant contact with the electrolyte during rotation of the drum and are preferably disposed at remote ends of the electrolyte bath and are composed of a material insoluble in the electrolyte and free from electrolytic attack thereby. I have surprisingly found that excellent results can be attained when the conductive electrodes are constituted by the end walls of the drum and rotate therewith, the cylindrical drum wall forming the insulating spacer for these electrodes. At least one but preferably both of these end walls are provided with a passage for circulating the electrolyte through the drum, the axial passage terminating in a fan-like array of bores opening into the drum at the face of the end wall contacting the electrolyte. The drum may further be provided, at least at regions extending above the electrolyte level therein, with apertures or vents enabling evacuation of the gaseous products of the electrolytic deburring of the workpieces.

Still another aspect of this invention resides in my discovery that irregular deburring can be avoided by injecting an inert gas into the electrolyte bath with the recirculating electrolyte stream. It appears that the inert gas creates labyrinthian paths for the electric current flowing through the electrolyte, i.e. the ion-mobility paths, thereby distributing the electrochemical action substantially uniformly. This technique has the additional advantage that the inert gas upon evolution from the electrolyte acts as a diluent for the nascent gases generated by electrolysis and led off through the vents above the electrolyte level. The inert gas may be admixed with the electrolyte in the bath or with the liquid prior to its introduction into the tumbling drum. Furthermore, in accordance with the principles already discussed above in general terms, I provide a magnetic flux radially through the drum, i.e. vertically when the drum is horizontal, preferably at a location intermediate the electrode, to facilitate the agitation of the electrolyte, the workpieces, and the carbon particles forming intermediate electrodes for the deburring action. These carbon particles have an abrasive or semiabrasive character so that they mechanically co-operate with the workpieces to supplement the electrochemical deburring by mechanical erosion of the rough surfaces. Thus the carbon particles may be carbonaceous materials of relatively high hardness (e.g. synthetic diamond as produced by the system described in my U.S. Pat. No. 3,207,582 or the nondiamond but high-hardness carbon particles obtained when synthetic diamond is made in accordance with that process).

Further investigations into the phenomenon described above, i.e. the ability of conductive particles to act as secondary electrodes when an electric current is applied across the electrolyte to solubilize portions of the workpiece surface, have demonstrated that the volume ratio of the workpieces and the conductive particles in a deburring system is important.

More specifically, I have found that there is a tendency with large ratios of total workpiece volume to total conductive-particle volume, for electric discharges to occur between the workpieces and damage the surfaces of the latter, in spite of the fact that these workpieces are randomly distributed in the electrolyte/conductive particle system.

I have also discovered that it is possible to avoid such electrical discharges by providing a large proportion of conductive particles so that the volume ratio of the workpieces to the conductive particles ranges between 1:1 and 1:20. The term "volume ratio" as used herein is intended to refer to the "bulk volume" as measured by cascading the workpieces and the particles, respectively, into confined spaces. Within this range, a qualitative improvement of the deburring process is observed. In addition I have found that there is a relationship between deburring effectiveness and the relative sizes of the workpiece and the conductive particle. Here it should be noted that the conductive workpieces to be deburred will generally be of uniform size and shape, they being derived from a system for the mass production of such workpieces. Similarly, the conductive particles will generally be of a uniform size and shape. In this connection, it has been found to be advantageous to provide a conductive particle having a volume ranging between $\frac{1}{10}$ to 3 times the volume of the individual workpiece and, where workpieces of different size or shape are used, the average volume of the workpieces. In this case, the actual volume occupied by the workpiece or the particle is the quantity of interest.

Consistent with the foregoing discussion, is the fact that the process of the present invention is often best carried out in a relatively small quantity of electrolyte so that an intimate relationship between the workpieces, conductive particles and electrolyte is assured. The volume of the conductive particles may make up the major fraction of the electrolyte/conductive particle system. Hence, the volume of the conductive particles may exceed the volume of the electrolyte.

The present invention also contemplates the provision of means for compensating the system or depletion of the electrolyte by evaporation or decomposition, either to permit control of the electrolyte in accordance with the principle thus enunciated or simply to maintain the electrolyte in as close to its original condition as possible. I may provide, therefore, a pair of electrodes in contact with the electrolyte and connect the latter to a source of electric current and to a current-responsive sensor for operating a valve system adapted to introduce additional quantities of electrolyte into the vessel upon an increase in the electrolyte concentration or simply a reduction in the electrolyte level representing a loss of electrolyte.

Advantageously, the system includes mechanical vibrating means which, as described earlier, not only serve to agitate the workpiece in contact with the electrolyte, but also co-operate with an upwardly extending helical or spiral channel along which the electrolyte, conductive particles and workpieces are advanced between the electrodes. At the upper portion of the helix, the workpieces may be separated from the electrolyte which can return to the vessel. Additional electrolyte may be provided at any point along the helical path at which depletion is detected in the manner set forth above or at the beginning of said path. In order to facilitate advance of the workpieces along the upwardly inclined helical transport path, I may mount the vessel resiliently and provide vibrating means such that a rotation or angular vibration is provided in addition to an axial or vertical vibration.

I have found it to be advantageous, moreover, to provide support means for the workpiece aside from the ramp discussed above which imparts an angular velocity to the workpieces or to the system of conductive particles. For example, the workpiece may be held stationary in a suitable holder while the entire electrolyte/conductive particle system is spun or rotated around the holder.

I may also mention that, although a number of electrolytes have been found to be suitable, certain compositions have more recently been discovered to have unusual results. For example, it has been observed that for relative rough deburring operations, the electrolyte should include one or more of the anions of the nitrate, nitrite and chloride class, whereas such anions should be avoided when finishing operations are to be carried out. Finishing electrolytes preferably will include an acid and a brightener, smoother or finisher from the group which consists of glycerine, gelatin or the like. More particularly, for iron and iron-containing or ferrous metal workpieces one or more of the following electrolytes is used with maximum effectiveness:

(a)

| | Percent by weight |
|---|---|
| Sulfuric acid | 30–70 |
| Glycerine | 20–60 |
| Balance water. | |

(b)

| | Percent by weight |
|---|---|
| Sulfuric acid | 30–70 |
| Fluoboric acid | 5–25 |
| Oxalic acid | 0.5–1.5 |
| Balance water. | |

(c)

| | Percent by weight |
|---|---|
| Phosphoric acid | 70–90 |
| Gelatin | 0.5–10 |
| Balance water. | |

For copper and copper alloy workpieces, the following electrolyte has been found to be effective:

(d)

| | Percent by weight |
|---|---|
| Sulfuric acid | 40–60 |
| Acetic acid | 5–15 |
| Chromic acid | 5–15 |
| Balance water. | |

For aluminum and aluminum alloy workpieces, the following composition has been found to yield the best electrolyte:

(e)

| | Percent by weight |
|---|---|
| Sodium carbonate | 10–20 |
| Sodium phosphate | 2–10 |
| Glycerine | 40–60 |
| Fluoboric acid and/or ammonium borofluoride | 1–5 |
| Balance water. | |

For tungsten and tungsten alloy workpieces, the most suitable electrolyte is:

(f)

| | Percent by weight |
|---|---|
| Nitric acid | 15–30 |
| Hydrogen fluoride | 20–40 |
| Balance phosphoric acid. | |

For metal-carbide workpieces, the following electrolyte has been found to be effective:

(g)

| | Percent by weight |
|---|---|
| Ferric chloride | 40–60 |
| Hydrogen chloride | 0.5–2 |

Balance nitric acid.

Each of the compositions (a)–(g) may include up to 2% of one or more of the following finishing and brightening compounds:

sodium oleate
sodium laureate
sodium stearate
sodium palmitate
sodium alkyl sulfonate where the alkyl group has from 6 to 22 carbon atoms in the carbon chain and sodium alcohol-ester sulfates where the alcohol group has a carbon chain with 6 to 22 carbon atoms.

(6) DESCRIPTION OF THE DRAWING

The above and other objects, features and advantages of the present invention will become more readily apparent from the following description, reference being made to the accompanying drawing in which:

FIG. 1 is an axial cross-sectional view through a tumbling drum of a deburring apparatus in accordance with this invention;

FIG. 24 is a section similar to that of FIG. 20 but illustrating another arrangement of the drum;

FIG. 25 is a section generally along line XXV—XXV of FIG. 24; and

FIG. 26 is a view similar to FIG. 25 illustrating another embodiment of the invention.

(7) SPECIFIC DESCRIPTION

In FIG. 1, I show a rotary tumbling system for the deburring of metallic workpieces in which a closed drum 1010 has a pair of end walls 1017 and 1018 forming electrodes and retaining the electrolyte 1011 in the drum. Between the conductive electrodes 1017 and 1018, the drum is formed as a nonconductive sleeve 1040 composed of or lined with electrically insulating material such as a hard rubber or an electrolyte-resistant synthetic resin (e.g. a polyacrylate). Electrically insulating rubber gaskets 1042 are provided between the drum body 1041 and the electrodes 1017 and 1018. The drum may also be formed with a door 1045 to permit the workpieces and intermediate electrodes to be introduced into the interior of the drum. The electrodes 1017 and 1018, which are inert to the electrochemical action and to the electrolyte, are composed of graphite or an insoluble metal (e.g. stainless steel or Monel). The drum 1010 is mounted upon a pair of trunnions 1024a and 1024b extending upwardly from a base and defining for the drum a horizontal axis. The drum is, in turn, carried by a pair of tubular shafts 1023a and 1023b affixed to the respective electrode end walls 1017 and 1018 as described in connection with FIGS. 2A, 2B and FIGS. 3A, 3B.

The drive means for the drum comprises a motor 1027 whose output shaft 1028 is connected by a V-belt transmission 1030 with the hollow shaft 1023a to rotate the drum about its horizontal axis. The electric current for the electrochemical deburring operation is provided by a power supply 1019 and is applied via a pair of brushes 1019a and 1019b to the electrodes 1017 and 1018 via their shafts 1023a and 1023b. Electrolyte is circulated through the drum by a pump 1039 and a circulating system including an inlet pipe 1040 connected with the tubular shaft 1023b. The tubular shaft 1023a leads electrolyte from the drum to a return tube 1043 ending at a reservoir 1044.

Figure 5:
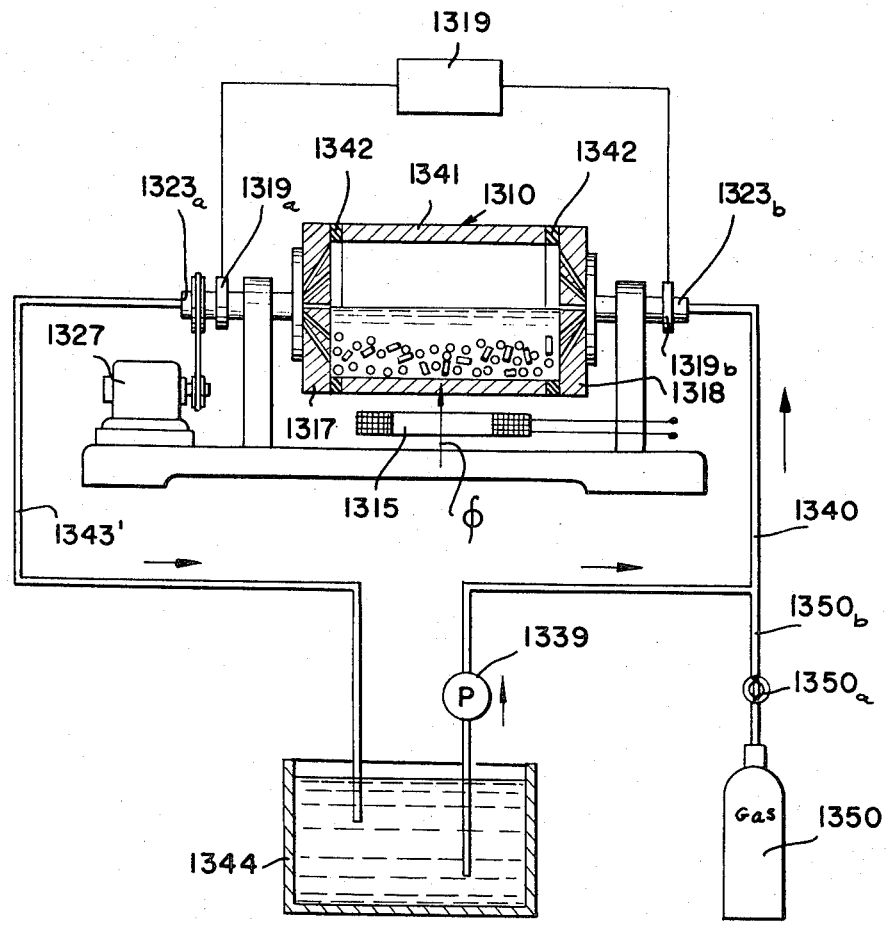
FIG. 5 is a view similar to FIG. 1 of a modified system for deburring metallic workpieces.
Figure 6:
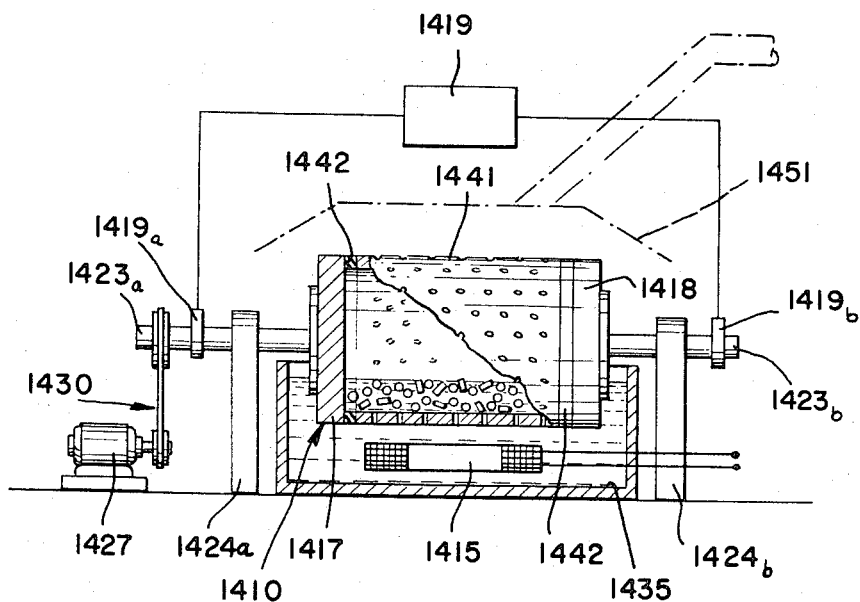
FIG. 6 is an axial cross-sectional view through a tumbling system embodying other principles of this invention.

The electrode 1017 and 1018 may be provided with a fan-shaped array of bores (FIGS. 2A and 2B) or a central array of mutually parallel bores (FIGS. 3A and 3B), while means may be provided for injecting a gas into the liquid-circulating stream (FIG. 5) and a magnetic field may be applied in the radial direction (FIGS. 5 and 6). In the embodiment illustrated in FIG. 1, however, the end walls and electrodes 1017 and 1018 are provided with axially extending bores 1017' and 1018' communicating with the hollow shafts 1023a and 1023b, respectively.

Within the drum I provide, in addition to the electrolyte 1011, a mass of metallic workpieces 1012 (shown as rectangles) accompanied by conductive particles 1013 (hatched circles) and, if desired, magnetic and abrasive particles as described in U.S. Pat. 3,533,928. The electrolyte may be any of the electrochemical machining solutions described in Pats. 3,475,312, 3,417,006 and 3,420,759.

While any of the aforedescribed electrolytes has been found to be more or less effective for the deburring of metallic workpieces, certain electrolytes perform optimally with certain workpieces. For example, for iron and other ferrous-metal workpieces I prefer a composition of 30 to 70% by weight sulfuric acid and 20 to 60% by weight glycerine or 5 to 25% by weight fluoboric acid, the latter being used with 0.5 to 1.5% by weight oxalic acid. An alternative is a composition containing 70 to 90% phosphoric acid and a small amount of gelatin. The balance is water in all cases and the composition may include brighteners or finishing substances such as the sodium salts of the fatty acids, the sodium alkyl sulfonates and the sodium alcohol-ester sulfates mentioned earlier.

The particles 1013 are composed of carbon and act as intermediate electrodes. An important aspect of this invention resides in the fact that the carbon particles are formed of relatively high hardness carbonaceous material capable of withstanding metallic abrasion in the tumbling of the workpieces. Suitable particles may be made by sintering pyrolytic carbon or by the electric-discharge technique set forth in my Pat. 3,207,582. In addition, the carbon particles may contain silicon carbide or the like abrasive powder dispersed therein prior to sintering. As a result, the electrochemical action is augmented by a mechanical smoothing of the workpieces concurrent with electrochemical removal of projecting portions of the workpieces (i.e. burrs). The deburring power supply 1019 may be any electrolysis source as described in U.S. Pat. 3,533,928. Suitable sources may be alternating current, pulsating direct current or filtered direct current as there described.

EXAMPLE I

Using the system of FIG. 1, deburring was carried out in a 15% sodium chloride solution upon a mass of 35% by volume of steel workpieces having a diameter of 10 mm. and a length of 5 mm. Conductive particles, i.e. sintered pyrolytic graphite and silicon carbide particles with a diameter of about 5 mm. were used in a ratio to the workpiece quantity of about 1.15:1; it was possible to increase the deburring rate over conventional systems using only aluminum oxide abrasive particles and a similar drum (diameter 300 mm., axial length of 7 mm., electrolyte quantity 5 liters, current 80 amp.), in terms of the quantity of material removed per unit time, from 10 to 30 times, and to obtain an improved surface finish.

Figures 2A, 2B:
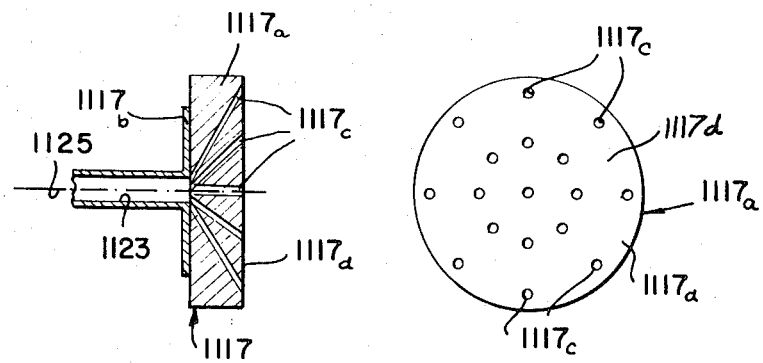
FIG. 2A is an axial cross-sectional view of an electrode forming an end wall of the drum.
FIG. 2B is an elevational view thereof.

In FIGS. 2A and 2B, I show a modified version of the terminal electrode for the drum of FIGS. 1, 5 and 6, the electrodes 1117 generally comprising a disk 1117a of graphite of other electrochemically inert material attached at a flange 1117b to the tubular shaft 1123. A fanlike array of bores 1117c is formed in the disk 1117a and open at the inner face 1117d in contact with the electrolyte within the drum. From FIG. 2B it is apparent that the bores are distributed in conical arrays about axis of rotation of the drum (represented at 1125) so that a number of these bores open into the drum above the liquid level (see FIG. 1) at each of the electrodes 1017 and 1018. Thus gas forming above the electrolyte bath can pass through the uppermost bores and can be entrained with the liquid stream leaving the drum and flowing to the reservoir 1044. In this reservoir, which is open to the atmosphere, the gases entrained in the liquid can evolve into the atmosphere. The fanlike array of bores has the additional advantage that, at the inlet electrode (e.g. electrode 1018), the bores disperse the liquid and any gases entrained therein (FIGS. 5 and 6) to insure fine distribution of gas bubbles in the electrolyte bath and even deliver some gas above the electrolyte to act as a diluent for the electrolytically evolved gases. The bores 1117c converge axially away from the drum to communicate with the tubular shaft 1123 and thus form a manifold.

Figures 3A, 3B:
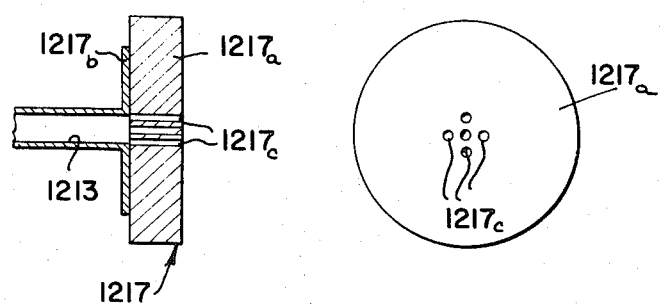
FIG. 3A is a cross-sectional view through a modified electrode.
FIG. 3B is an elevational view of this latter electrode.

Electrode 1217 of FIGS. 3A and 3B represents a modified construction in which the disk 1217a is formed with a plurality of mutually spaced parallel bores 1217c which are located in the region of the center of the disk and communicating with the hollow shaft 1223 which is attached to the disk 1217a at a flange 1217b. This embodiment has the dispersing advantages mentioned in connection with the electrodes of FIGS. 2A and 2B but does not evacuate gases from above the electrolyte level as effectively. Either of the electrodes of FIGS. 2A and 2B and of FIGS. 3A and 3B can be used in the drum deburring systems of FIGS. 1, 5 and 6.

Figure 4:
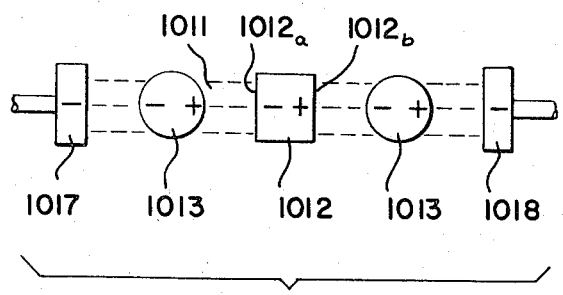
FIG. 4 is a diagram of the electrochemical deburring system of the present invention.

In FIG. 4, there is shown a diagram of the principles of the present invention. In this figure, I show the workpieces 1012 as fortuitously located between a pair of carbon particles 1013 and the electrodes 1017 and 1018. If electrode 1017 is positive as shown for the purposes of the explanation of this electrochemical phenomenon, it will be seen that a proximal carbon particle 1013 received an inducted charge so that its region juxtaposed with surface 1012 in the electrolyte 1011 acts as an electrode to sustain electrochemical machining of this workpiece surface. The random distribution of conductive particles and workpieces between the electrodes is effective to insure practically uniform electrochemical treatment of all workpiece surfaces.

However, burrs or other projections invariably lie at shorter distances from one of the terminal electrodes or an effective intermediate electrode than the other portions of the surface from which they project. The electrochemical machining current density is substantially higher at these protuberances and machining preferably occurs in these regions. Any mechanical smoothing is cumulative to the electrochemical action. It will be appreciated also that the presence of gas bubbles in the electrolyte augments the machining action and its specific attack upon protuberances and the burrs. It has been found that the gas bubbles tend to adhere to the surface of the workpiece in regions between the burrs and effectively insulate these regions while increasing the current density at the burrs. This, too, improves the surface finish and can be controlled by injecting inert gases into the system as will be described in connection with FIG. 5. The term "inert," however, must be construed in terms of the activity performed here. When the evolved gases include hydrogen, it will not be advisable to add oxygen and vice versa. Even normally active gases may be considered inert if they are nonexplosive when used in the presence of gases evolved from the deburring bath.

In FIG. 5, there is shown a horizontal drum 1310 with a central body 1341 held between a pair of gaskets 1342 and electrodes 1317 and 1318 of the type shown in FIGS. 2A and 2B. The electrodes are carried between the tubular shafts 1323a and 1323b whose slip rings are in contact with brushes 1319b and 1319a of the electrochemical machining power supply 1319. A motor 1327 drives the drum about its horizontal axis while electrolyte is circulated through the drum via a pump 1339 from the reservoir 1344 and a line 1340 communicating with hollow shaft 1323b. The electrolyte from the drum is returned via line 1343' to the reservoir.

In accordance with the principles of the present invention, gas is injected into the electrolyte prior to its passage into the drum, the gas-supply source being shown at 1350 in FIG. 5. The source is a tank of air, argon, carbon dioxide, nitrogen or the like which is connected via a valve 1350a and a line 1350b with the hollow shaft 1323b of electrode 1318. When the gas is forced under high pressure into the electrolyte which, in turn, is under pressure of pump 1339, the liquid/gas mixture entering the drum through the electrode 1318 expands to evolve the gas in the form of bubbles and, in part, to induce some of the gas into the drum above the electrolyte, thereby diluting the nascent gases released by electrolysis. The gas bubbles within the electrolyte adhere to the workpiece surfaces and augment the deburring action. An electromagnet 1315, whose flux can be represented by arrow $\Phi$ is provided beneath the drum 1310 and is effective to increase the electrochemical machining action.

The magnetic field may be of unidirectional or alternating type while the magnet itself may be stationary or reciprocating. The magnet may be energized by a high-frequency AC source in addition to a low-frequency vibrating or oscillating source. The high-frequency source preferably operates at 400 kHz. to 50 kHz. and end above sonic frequencies while the low-frequencies source operates at, say, 30 to 40 Hz. It appears that the magnetic field has a two-fold action whereby it induces a dynamic flow of liquid electrolyte and secondly, imparts magnetically attractive or repulsive motions to the workpieces when they are permeable.

In the system of FIG. 6, the drum 1410 has a cylindrical body 1441 which is perforated to evolve gases and permit electrolyte to enter the drum as the latter is rotated in a bath 1435. A hood 1451 overlies the bath 1435 and collects the evolved gases. Here too, the tumbling drum 1410 has a pair of disk-shaped electrodes 1417 and 1418 which are insulated from each other by the gaskets 1442 although the electrodes are here not perforated. Non-tubular shaft 1423a and 1423b rotatably support the drum 1410 in a pair of trunnions 1424a and 1424b. The drive means is constituted by a motor 1427 and a V-belt transmission 1430 connecting this motor with shaft 1423a. An electrolysis power supply 1419 applies electric current to the electrodes 1417 and 1418 by the brushes 1419a and 1419b. A magnetic field is applied, as previously describe, by the coil 1415 in the vessel 1435.

Figure 7:
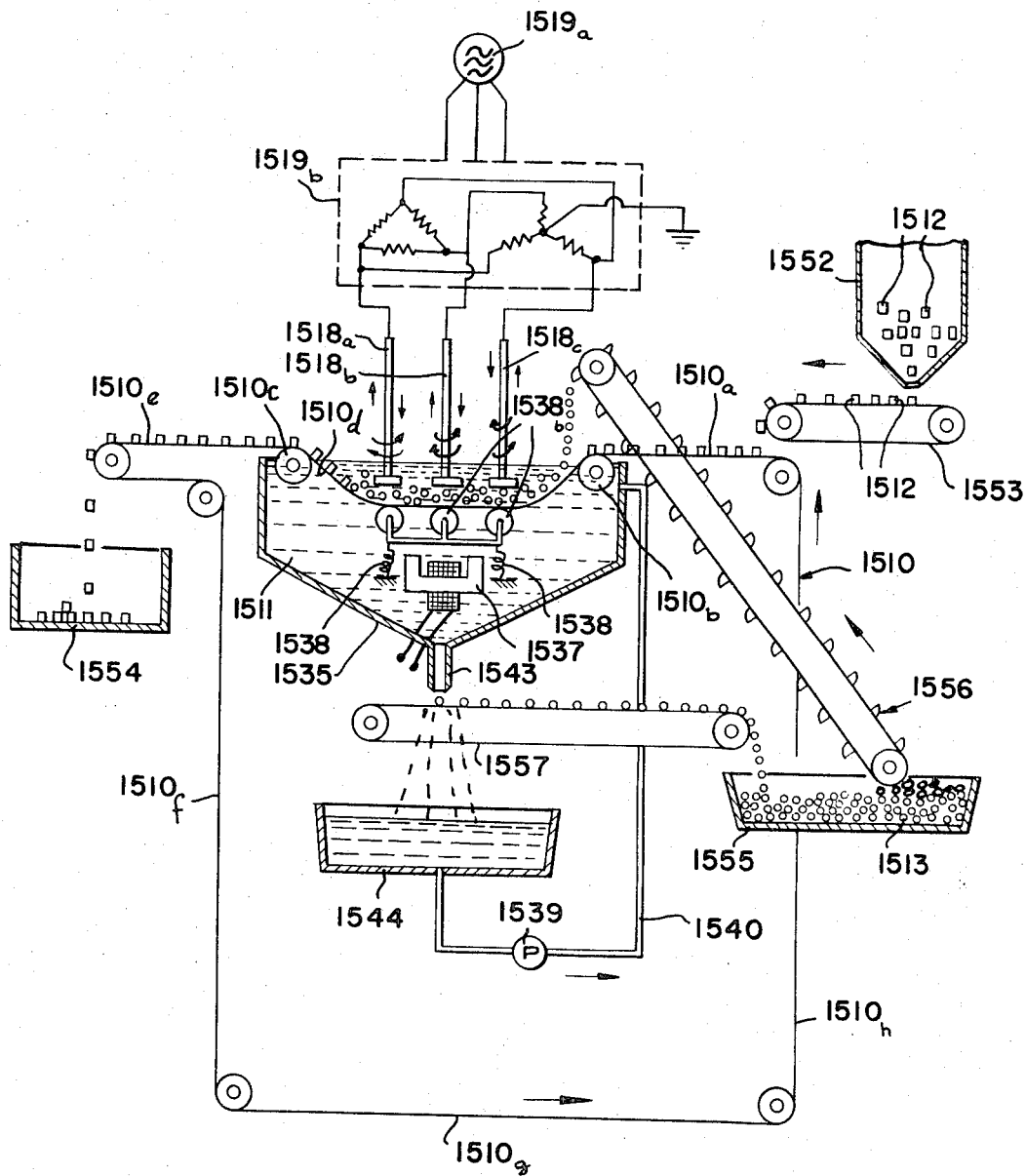
FIG. 7 is a diagram of a continuous deburring apparatus in accordance with the principles of this invention.

FIG. 7 shows a continuous system for the deburring of metallic workpieces wherein a succession of workpieces is deposited from a hopper 1552 upon a belt 1553 which directs these workpieces to a perforated endless belt 1510 which functions similarly to the drum of the preceding embodiments. The endless belt 1510, which has horizontal stretch 1510a receiving the workpieces 1512 from the conveyor 1553, passes over an idler pulley 1510b into the electrolyte bath 1511 in a vessel 1535 of funnel-shaped construction prior to emerging from the bath over a further pulley 1510c. Within the vessel 1535, I provide agitating means in the form of an electromagnet 1537 which vertically displaces an armature 1530 against a pair of compression springs 1538a to jumble the workpiece and carbon particles contained on the stretch 1510d of the belt passing through the electrolyte bath. The armature 1538 carries a number of rollers 1538b which support the belt in this region without frictionally impeding its movement.

Upon leaving the electrolyte bath 1511, the conveyor 1510 has a horizontal stretch 1510e overhanging a collecting receptacle 1554 in which the deburring workpieces are caught, the band being then returned to the horizontal stretch 1510a by downward stretch 1510f, a horizontal stretch 1510g and a vertical stretch 1510h.

Intermediate electrodes are formed by a mass of carbon particles 1513 as previously described. The carbon particles are retained in a supply trough 1555 and are carried by a bucket conveyor 1556 to the vessel 1511 where they are deposited upon the mass of workpieces entering the bath. The band 1510 is, as previously indicated, perforated and has openings through which the carbon particles may pass as they settle from the electrolysis zone. Thus, carbon particles which settle through the belt 1510 are discharged at an outlet 1543' of the vessel and are collected upon a sieve conveyor 1557 which carries them to the trough 1555. The electrolyte passing through the sieve conveyor 1557 is collected in the reservoir 1544 and recirculated by a pump 1539 and a line 1540 to the bath 1511.

The electrodes may comprise vertical rods 1518a, 1518b and 1518c which can be angularly oscillated about respective vertical axes and vertically reciprocated by the mechanisms shown for similar electrodes in the last-mentioned application. I have found, moreover, that improved power utilization can be obtained when a poly-phase power supply is available and the number of electrodes is equal $n \times P$ where P is the number of phases (usually three) available at the supply and $n$ is an integer. In this system, each phase is applied between one pair of electrodes or the corresponding electrodes of a pair of sets, each set having $n$ electrodes. In the simplified system of FIG. 7, the power supply comprises a three-phase source 1519a which supplies a conventional Y or Δ transformer diagrammatically represented at 1519b each of the output faces of which is applied across a pair of the electrodes 1518a through 1518c. The connections to these electrodes are shown both for Y and Δ systems although it will be understood that only one of these systems may be in use at any time. In the Y system, the neutral pole may be grounded at the transformer. This arrangement permits each phase of a three-phase current to be effective and provides a greater effectiveness of the supply power without the expense rectifier systems which would be necessary to produce direct current and the complex circuitry which would be necessary to convert the three-phase force current to single-phase balanced current in operating the deburring device. It has been found that the system is particularly desirable when a large number of workpieces with a relatively large total volume is to be deburred at one time.

Figure 8:
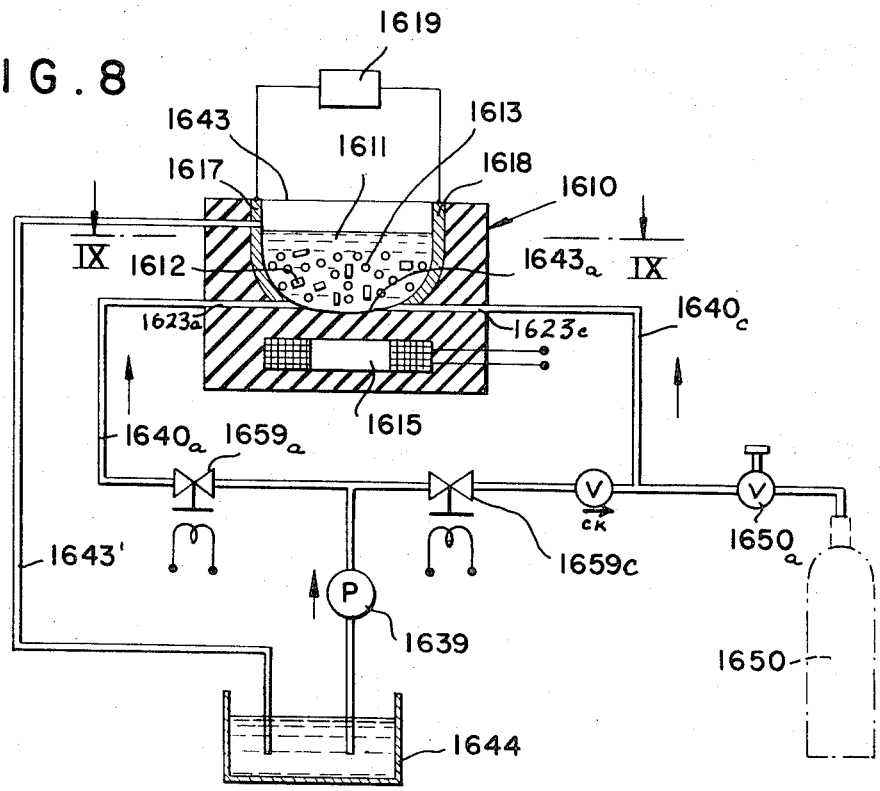
FIG. 8 is an axial cross-sectional view through a deburring apparatus uising a stationary system and diagrammaticaly showing the electrolyte-circulating means therefor.
Figure 9:
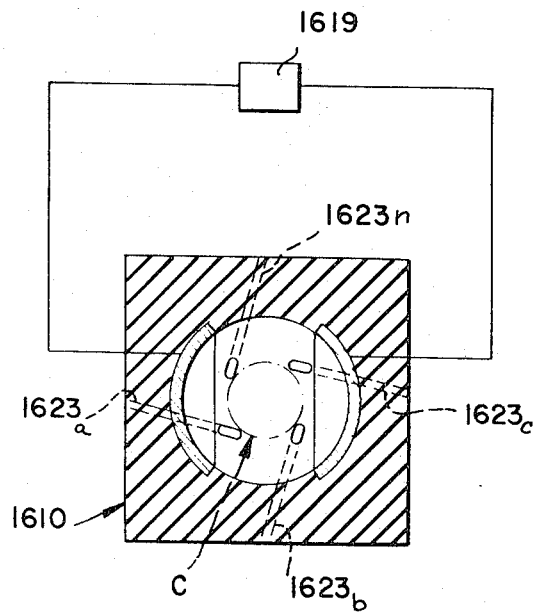
FIG. 9 is a cross-sectional view along the line IX—IX of FIG. 8.

In FIGS. 8 and 9, I show another embodiment of the present invention in which no continuously displaceable endless surface is provided and the agitation of the electrolyte, carbon particles and workpieces, is carried out by means of pulsed jets or high-velocity streams of electrolyte directed tangentially into the vessel at the deburring region. This system, while affording some mechanical smoothing by contact of the workpieces with the carbon particles and the electrodes and walls of the vessel, primarily is effective to promote electrochemical removal of material from the workpiece surfaces without any movable apparatus members. The freedom of this system from vibrational and rotational movement of electrodes, containers and the like eliminates the need for drive motors, journaling assemblies and the like, thereby making the entire apparatus more practical and less expensive, especially where small quantities of workpieces are to be treated.

In accordance with the principles of the present invention, the apparatus comprises a stationary vessel 1610 of electrically insulating material having an upwardly open pot-shaped chamber 1643 with an accurately concave bottom 1643a. A pair of electrodes 1617 and 1618 disposed at diametrically opposite locations along the inner wall of the chamber and energized by an electrochemical machining deburring power supply 1619 of the character previously described. The vessel contains an electrolyte 1611 in which the workpieces 1612 (diagrammatically shown as rectangles) and carbon particles 1613 (diagrammatically shown as circles) are distributed. The carbon particles 1613 are composed of sintered carbon to which abrasive powder has been added and may be used in conjunction with abrasive particles which contain no conductive material. When a number of pairs of electrodes are provided in this system, the considerations discussed in connection with FIG. 7 apply and the power supply may include a polyphase-current source each phase of which is connected across a respective pair of electrodes or a respective pair of electrode sets.

In the present embodiment, the agitation of the electrolyte, workpieces and carbon particles is carried out by a fluid stream and the bottom 1643a of the vessel may thus be provided with a plurality of liquid inlets 1623a, 1623b, 1623c, . . . 1623n forming electrolyte jets oriented generally tangentially to an imaginary circle C centered upon the vertical axis of the chamber and tangential as well to the curvature of the floor of the vessel as will be apparent from FIGS. 8 and 9. These inlets individually extend through the vessel 1610 and communicate via lines 1640a, etc. with a pump 1639 drawing electrolyte from the reservoir 1644. Electrolyte is returned to the reservoir via a line 1643'. Each of these lines is provided with a respective electromagnetically operable valve 1659a etc. which successively pulse the electrolyte jets introduced into the vessel. Consequently, a vortex agitation of the electrolyte is provided which dynamically coacts with gravitational force to produce the desired turbulence. When more turbulence is desired, the jets can be pulsed in random sequence rather than in succession as indicated. The deburring electrolyte may be admixed with inert gas (see FIG. 5) from a cylinder 1650 and a valve 1650a which may be injected into the electrolyte stream or may be added exclusively through one of the inlet passages (i.e. passage 1623c in the system of FIGS. 8 and 9).

EXAMPLE II

A series of comparative tests were carried out with the stationary vessel arrangements of FIGS. 8 and 9, with a rotary vessel system and with a vibratory vessel system as described below. The electrolyte was an aqueous solution of 15% by weight of potassium nitrite and the workpieces were hexagonal nuts composed of iron and of 8 mm. diameter. The nuts were of first grade JIS standard, black, class 4 M8SS41B–D with a total volume of 500 cc. The deburring elements added to the system were carbon particles of 15 mm. diameter or abrasive particles of alumina or silica, each of 15 mm. diameter. When particles were added, a total quantity of 2000 cc. of such particles were used. The rotary system involved 55 drum revolutions per minute, the vibratory system applied drum vibrations of 1500 cycles per minute and the jet system made use of an electrolyte pressure of 5 and 15 kg. per cm.$^2$. Four jets were employed in each case and the following tables give the total quantity of material removed in the deburring process, the voltage and amperage provided for the electrochemical action and the particle wear in percents by weight. The deburring operation for each case was carried out equally for 10 minutes.

1.—ROTARY SYSTEM

| Particles (v o. percent) | Voltage | Amperage | Particle wear (percent by wt.) | Deburred quantity (gr.) |
|---|---|---|---|---|
| (a) Carbon only | 37 | 88 | 3 | 48 |
| (b) Carbon (50), Al$_2$O$_3$ (50) | 72 | 35 | 4 | 20 |
| (c) Al$_2$O$_3$ (50), SiO$_2$ (50) | 90 | 35 | 0.1 | 20 |

2.—VIBRATORY SYSTEM

| | | | | |
|---|---|---|---|---|
| (a) Carbon only | 30 | 80 | 5 | 42 |
| (b) Carbon (50), Al$_2$O$_3$ (50) | 65 | 40 | 6 | 25 |
| (c) Al$_2$O$_3$ (50), SiO$_2$ (50) | 85 | 40 | 0.1 | 22 |

3.—JET SYSTEM (with 5 kg./cm.$^2$ electrolyte pressure)

| | | | | |
|---|---|---|---|---|
| (a) Carbon only | 18 | 90 | 4 | 52 |
| (b) Carbon (50), Al$_2$O$_3$ (50) | 45 | 60 | 3.6 | 38 |
| (c) Al$_2$O$_3$ (50), SiO$_2$ (50) | 62 | 45 | 0.2 | 26 |

4.—JET SYSTEM (with 15 kg./cm.$^2$ electrolyte pressure)

| | | | | |
|---|---|---|---|---|
| (a) Carbon only | 15 | 100 | 3 | 56 |
| (b) Carbon (50), Al$_2$O$_3$ (50) | 43 | 62 | 4 | 39 |
| (c) Al$_2$O$_3$ (50), SiO$_2$ (50) | 71 | 40 | 0.1 | 24 |

In addition, an electromagnet 1615 may be provided below the vessel as shown in FIG. 8 to augment the dynamic movement produced by the liquid jets by electromagnetically induced movements. It will also be understood that various combinations of the several systems may be provided as well. Thus, the systems of FIGS. 1, 5 and 6 may provide pulsed electrolyte jets to increase agitation while similar jets may be provided in the system of FIG. 7. A conveyor belt may be passed through the vessel of FIG. 8. The vessel of FIG. 8 may also be vibrated by electromagnetic means as shown in FIG. 7 or may co-operate with angularly oscillatable and vertically reciprocable electrodes as there shown.

Figure 10:
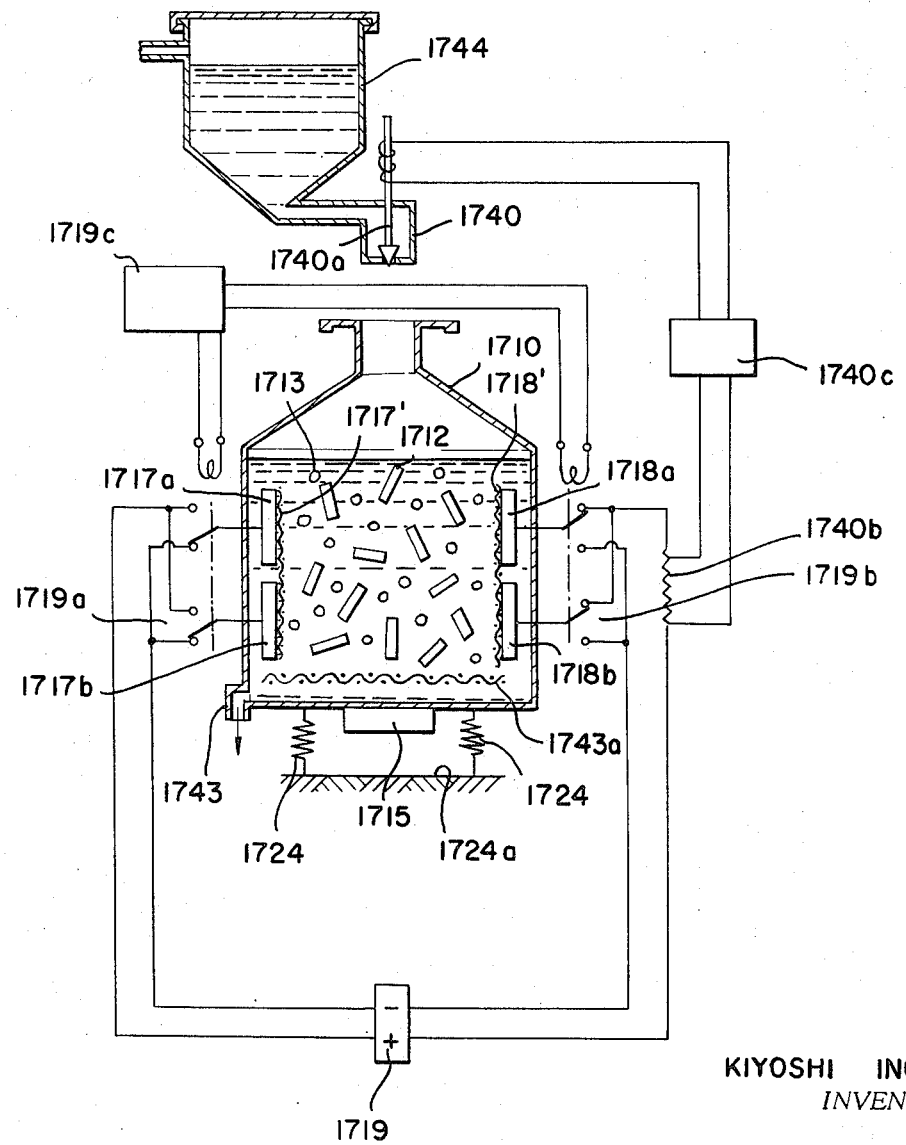
FIG. 10 is a diagrammatic cross-sectional view of a vibratory apparatus for deburring workpieces.
Figure 11:
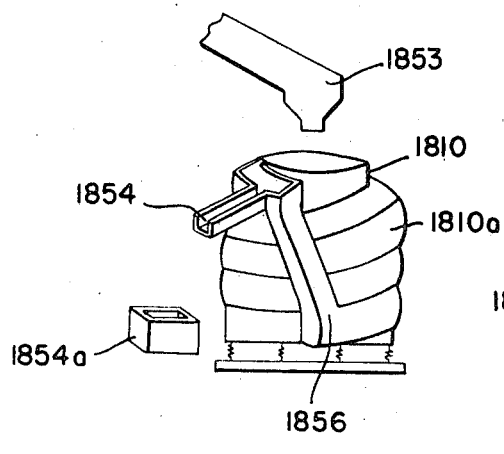
FIG. 11 is a diagrammatic perspective view of another apparatus embodying the invention.
Figure 12:
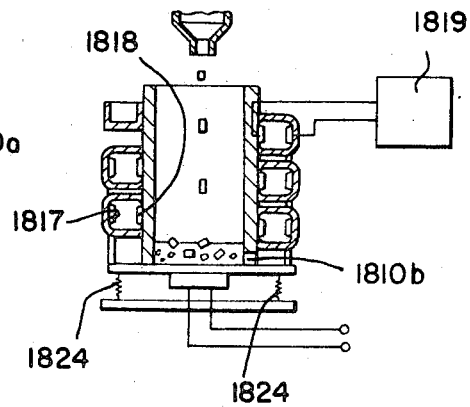
FIG. 12 is an axial cross section through the latter vessel.

In FIG. 10, I show a system for the deburring of metallic workpieces which comprises an upwardly open vessel 1710 containing metallic workpieces 1712 and graphite particles 1713 in an electrolyte generally represented at 1711. The vessel is supported resiliently, e.g. by springs 1724 upon a base 1724a and is provided with a mechanical or electromagnetic vibrator 1715 of the type previously described. Within the vessel, pairs of electrodes 1717a, 1717b and 1718a and 1718b are juxtaposed across the deburring region and are separated from the mass of particles and workpieces by nonconductive and mechanically strong screens 1717' and 1718'. The electrodes 1717a, 1717b and 1718a, 1718b are connected to common poles of a direct-current source 1719 via a reversing switch 1719a, 1719b, the electromagnetic actuators of which are operated by a timer 1719c to periodically reverse the polarities of the electrodes and measure uniform deburring.

The conductive particles 1713 are preferably graphite, as noted earlier, but may include silicon carbide, boron carbide or like abrasives or may be accompanied in the mass by abrasive particles of similar size.

Above the vessel 1710, I provide a dispenser 1740 with an electromagnetic valve 1740a controlling the supply of electrolyte from a reservoir 1744. Electrolyte may in part be recirculated from the outlet 1743 of the vessel to the reservoir 1744 as described, for example, in connection with FIG. 7. A current-responsive means in the form of a resistor 1740b in series with the source 1717 and one of the electrode pairs 1718a, 1718b, produces a signal which is detected and amplified at 1740c to control the valve 1740a. In addition, a timer may be provided for periodic opening of valve 1740 to feed electrolyte to the system. However, it has been found desirable, as noted earlier, to limit the proportion of electrolyte to the conductive particles and thus I prefer to use the electrolyte sensor of FIG. 10 to provide the minimum additional electrolyte necessary for deburring. It will be understood that the electrolyte within the vessel tends to become depleted by reason of electrolyte decomposition and evaporation. As a result of such depletion, there is a change in the resistance across the vessel, corresponding to a change in the current flow through resistor 1740b and modification of the voltage drop thereacross. As soon as the electrolyte content of the vessel falls, replacement electrolyte is added.

At the base of the vessel, I provide a screen or perforated plate 1743a with openings smaller than the sizes of the particles and workpieces to enable contaminated electrolyte to be drained through the screen 1743a. This system has an advantage in that large electrolyte volumes in some cases co-operate with workpieces of a particular configuration to prevent true random movement of the workpieces in the electrode.

In the foregoing, I have described "batch" processing of workpieces by random movement of the workpieces and the conductive particles in a tumbling drum or a container and also the somewhat controlled deburring of workpieces carried by a conveyor through an electrolyte. In the latter case, it is not always possible to remove the workpieces in the order in which they are introduced into the system. Such removal may be desirable from time to time and I have found that it is possible to achieve this result by tumbling the workpieces on a continuous carrier.

In FIGS. 11–14, I show an apparatus capable of processing the workpieces continuously with the advantages of a tumbling system and yet the advantages of a continuous through-flow arrangement. In this system, the vessel 1810 is formed with a helical upwardly extending duct or passage 1810a which communicates with the interior of the vessel at an opening 1810b toward the bottom thereof. The vessel 1810 is mounted resiliently by springs 1824 as shown diagrammatically in FIG. 12 but in structural terms in FIG. 13. In this figure, the springs 1824 are shown to be resilient blades anchored at 1824a to a pedestal 1824b and supporting the vessel 1810 at 1824c. An electromagnetic coil 1815 is provided on the pedestal 1824b and is juxtaposed with an armature 1815a carried by the vessel 1810. A periodic-current source

1815b adapted to generate a sinusoid, a square wave or a sawtooth signal as indicated, is connected to the vibrator coil 1815.

As the vessel 1810 is vibrated, the leaf springs 1824 impart an angular oscillation thereto in addition to a vertical oscillation component, thereby causing the workpieces to climb upwardly along the ramp 1810a. The workpieces are dispensed by a device 1853 as described, for example, in connection with FIG. 7 and electrolyte may be added at the same time as described in accordance with the principle of FIG. 10. In fact, any resistance change representing electrolyte depletion, may be detected to add electrolyte as previously discussed.

The walls of the channel 1810a are provided with electrodes 1817 and 1818 which may be spaced along the channel or may be provided as continuous helical strips and are connected to a machining-current source 1819 in the usual manner. Consequently, the workpieces, particles and electrolyte move upwardly along the ramp by reason of the oscillatory motion generated at 1815 and engage in a tumbling action to effect deburring of the workpiece. In movement upwardly along the path, excess electrolyte tends to drain from the particles and workpiece which are merely wetted or coated with a thin film of electrolyte. Highly efficient deburring is found to take place under these conditions. At the top of the helical path, I provide a chute 1854 for feeding the deburred workpieces into a receptacle 1854a while the conductive particles in any residual electrolyte is returned via a duct 1856 to the bottom of the spiral path. When untreated workpieces are supplied at 1553 at the same rate that deburred workpieces are recovered at 1854, I am able to obtain a continuous deburring of the workpieces.

If it appears that a single pass along the helical channel is insufficient for the desired degree of deburring, the chute may be closed and the workpieces recycled for as many passes as may be necessary.

Figure 14:
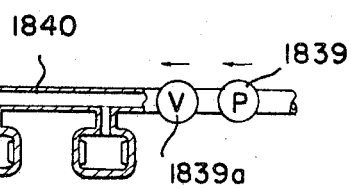
FIG. 14 is a cross-sectional view illustrating the electrolyte supply to the latter vessel.
Figure 13:
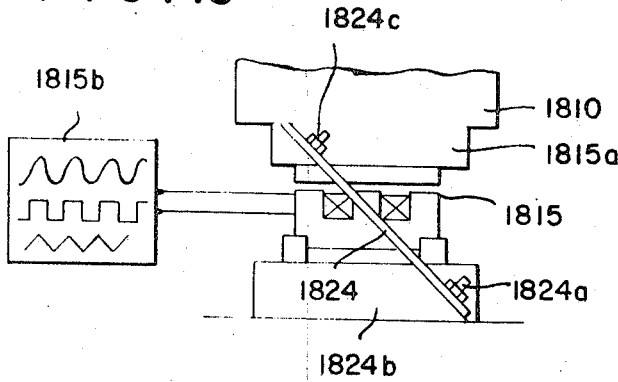
FIG. 13 is an elevational view of the vibratile mounting of the vessel.

As illustrated in FIG. 14, a duct 1840 provided with a pump 1839 and a valve 1839a may supply the channel 1810a at one or another of its turns with electrolyte should the electrolyte proportion at any particular region of the channel appear to be insufficient.

Figure 15:
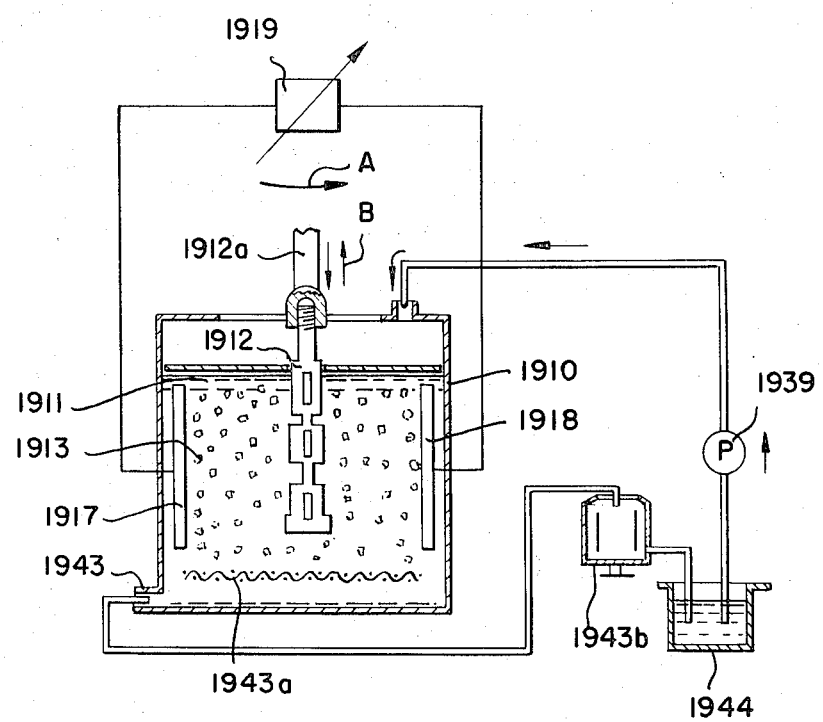
FIG. 15 is a diagrammatical vertical section through another embodiment of the invention.

As has been mentioned earlier, an important feature of the invention resides in the supporting of a workpiece with at least a surface thereof in contact with the electrolyte under succession in which the conductive particles are in random movement and the workpieces are either constrained to movement in a well-defined pattern or are immobile. It is important to note that it is the random movement of the particles which allows for the deburring of intricate surfaces and that is may be achieved by imparting random movement also to the workpiece or by confining the workpiece to one or more degrees of freedom while effecting a random movement of the particles. In the embodiment of FIG. 15, the vessel 1910 may be vibrated by means similar to that shown in FIG. 10 and may have a pair of electrodes 1917 and 1918 connected to a source 1919 of direct current. The conductive and abrasive particles are here represented at 1913 while the elongated workpiece is shown at 1912, the vessel being filled with electrolyte 1911. Depleted electrolyte is drawn at 1943 from the vessel below the screen 1943a and is passed into a filter 1943b before entering the reservoir 1944. From the reservoir, a pump 1939 returns electrolyte to the vessel.

The workpiece 1912 is here held in an insulating chuck 1912a which may receive rotary motion as represented by the arrow A or vertical reciprocating motion as represented by the arrows B to impart random movement to the particles in the electrolyte. I have found that, where the workpiece holder is electrically insulated, electrochemical deburring can be localized to any desired portion of the workpiece by confining the contact of the workpiece with the electrolyte to this region.

Figure 16:
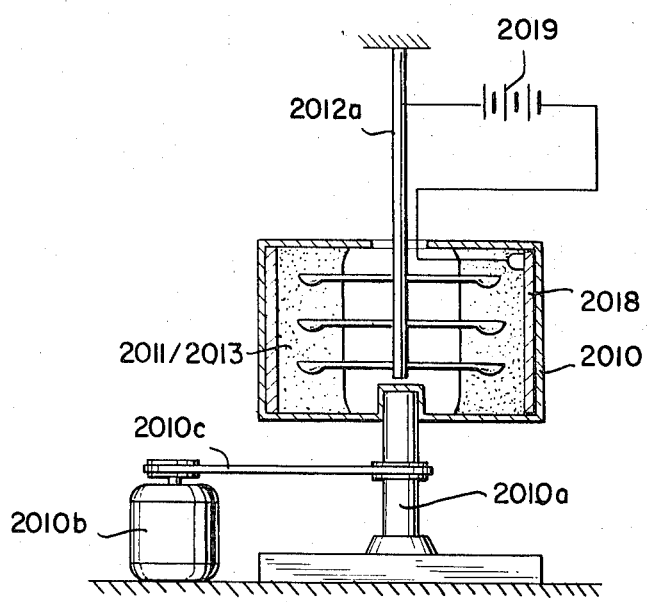
FIG. 16 is a diagrammatical section through an apparatus illustrating a feature of the invention wherein the workpieces are held stationary and the electrolyte-conductive particle system rotates.

FIG. 16 shows another embodiment in which the workpieces are displaced. In this case, random motion is not provided, but the relative speeds of the conductive-particle/electrolyte system and the workpiece are made sufficiently high for the deburring to be accomplished as if a free random motion is created. In fact, skin effects at the interface between the workpieces and the particle/electrolyte system tend to create some random movement of the particles. In this embodiment, the vessel 2010 is rotatably mounted upon a spindle 2010a driven by a motor 2010b via a belt drive 2010c. The workpieces 2012, here metal forks for culinary purposes, extend radially from a holder 2012a which is nonrotatable. The holder is electrically conductive so that each workpiece forms one pole of an electrical system energized by the DC source 2019, the other electrode being a conductive wall 2018. The conductive-particle/electrolyte system is represented at 2011/2013 and is shown to be centrifugally held against the outer wall of the vessel. The bowls of the forks and the tines thereof are surrounded by the electrolyte/particle system.

EXAMPLE III

Using the apparatus illustrated in FIG. 16, stamped metal forks are deburred in the electrolyte consisting of a 15% aqueous solution of potassium nitrate in which 300 mesh graphite particles are distributed in an amount of about 55% of the particle/electrolyte system. The cylindrical container is rotated at a speed sufficient to retain the electrolyte/particle system against the wall of the container by centrifugal force. The machining voltage of 60 volts is applied across the holder and the inner wall of the container and deburring is carried out for 12 minutes. Each of the forks is found to be fully polished over its entire area received in the electrolyte/particle mixture, including the channels between the tines. A lustrous surface is obtained. When 100 mesh boron carbide powder is added in an amount of about 10% of the graphite particles, a 20% reduction in the machining time is attained.

Figure 17:
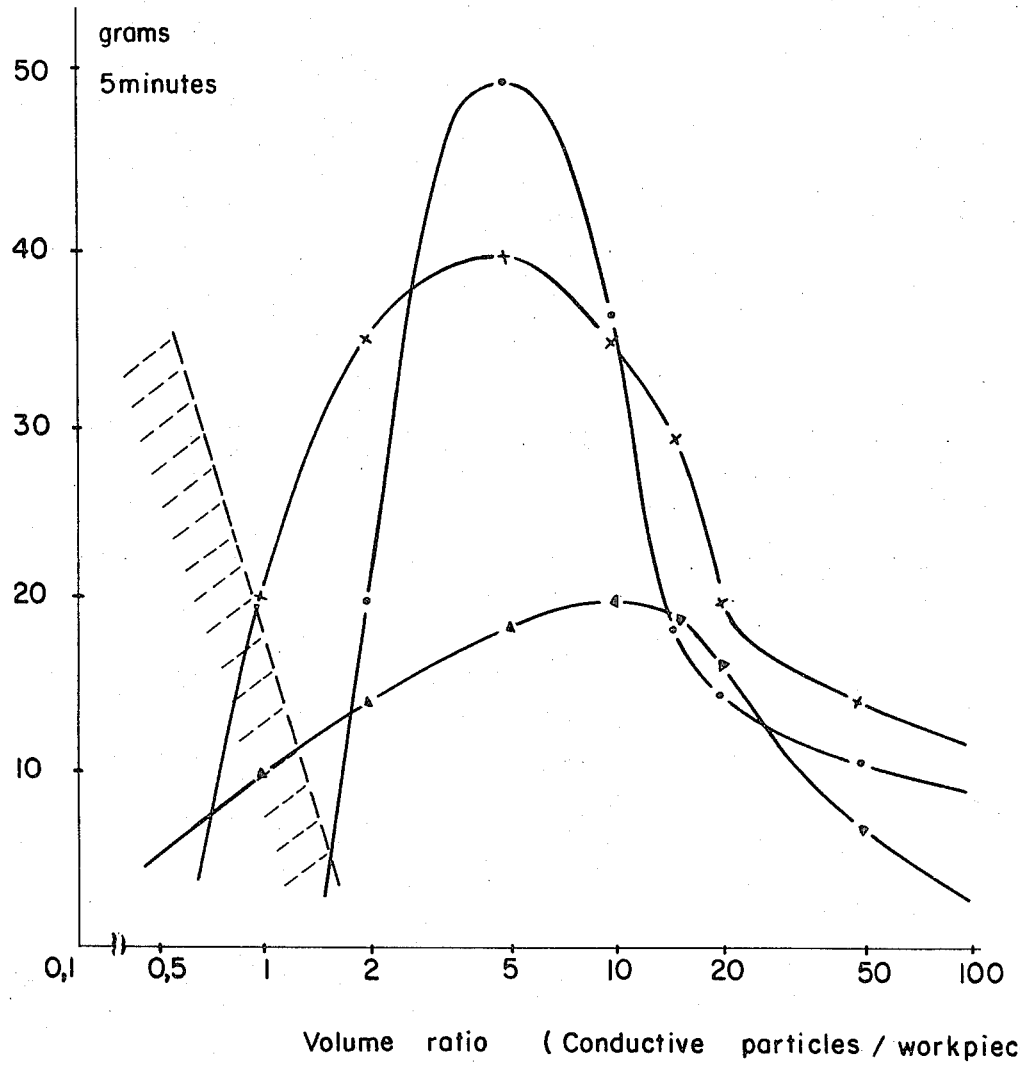
FIG. 17 is a graph illustrating further features of the instant invention.
Figure 18:
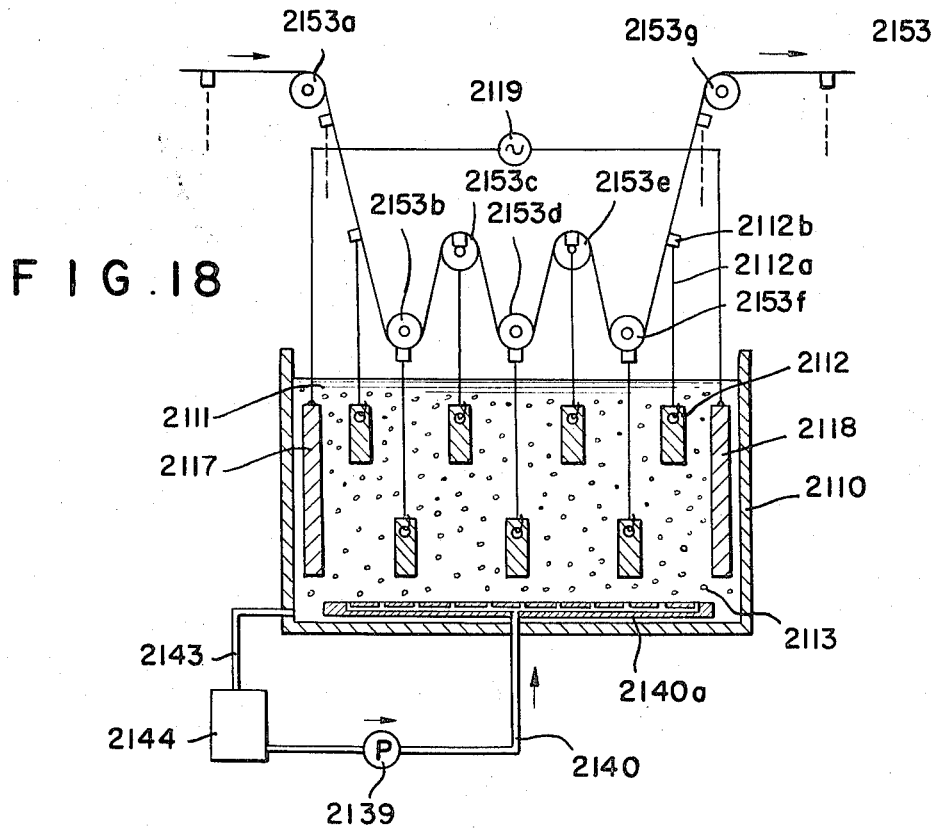
FIG. 18 is a vertical cross-sectional view of an apparatus according to another embodiment of the invention wherein the workpieces are supported in the electrolyte by suspension.

In FIG. 17, I have shown the results of tests made to determine the effect of the proportion of conductive particles and the size of these particles. In Test A, the electrolyte was a 10% aqueous solution of potassium nitrate, the workpieces were brass nuts having a diameter of 8 mm. and the conductive particles were graphite balls having a diameter of 5 to 8 mm. In Test B the electrolyte was a 5% aqueous solution of sodium chloride, the graphite particles were the same as those of Test A and the workpieces were steel nuts having a diameter of 8 mm. In Test C, the same materials were used as in Test B except that the electrolyte was a 15% aqueous sodium chloride solution.

In FIG. 17, I have plotted the apparent or bulk volume ratio of conductive particles to workpieces along the abscissa and the deburring speed in terms of grams of metal removed over a period of five minutes along the ordinate. The broken line represents the region in which discharge is found to occur with deterioration of the workpiece surfaces. The graph shows that between a volume ratio of one and a volume ratio of about 20, the most effective results are obtained.

FIGS. 18–26 illustrate other aspects of the invention dealing, in part, with other systems in which a workpiece is positioned in the electrolyte and is subjected to random motion therein. Thus, in FIG. 18, I provide a vessel 2110 containing the electrolyte 2111, conductive and abrasive particles 2113 and workpieces 2112. The latter are suspended from hooks 2112a swingably carried by tabs 2112b affixed to a conveyor 2153. The electrodes 2117 and 2118 are connected with a machining current source 2119 as described, for example, in connection with FIG. 7. The conveyor band 2153 passes over a roller 2153a downwardly into the bath and then under and over rollers 2153b–2153g to alternately lower the workpieces in the bath and raises them by imparting movement to the particles and the electrolyte as the workpieces traverse the bath. Electrolyte is drawn from the system at 2143, clarified at 2144 and recirculated by pump 2139 and a pipe 2140 to the vessel. To further agitate the particles and to produce random motion in the electrolyte, a diffuser plate 2140a is provided at the base of the vessel 2110 to distribute the circulating electrolyte into a multiplicity of upwardly-moving streams.

Figure 19:
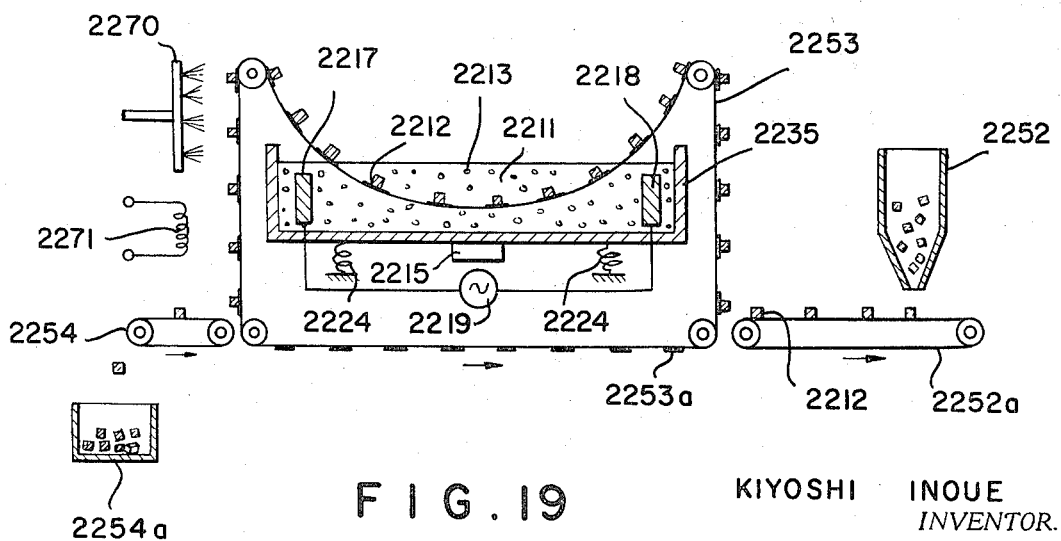
FIG. 19 is a vertical cross-sectional view of an apparatus according to the invention using magnetic support of the workpieces.

The conveyor 2253 of FIG. 19 is formed with magnets 2253a at spaced-apart locations for taking up a succession of workpieces 2212 from a feed conveyor 2252a as these workpieces are delivered from the hopper 2252. The conveyor 2253 holds each workpiece stationary as the workpieces are removed through the electrolyte 2211 for machining against the conductive particles 2213 as previously described. A further conveyor 2254 dislodges each workpiece and delivers it to a receptacle 2254a. The workpieces leaving the vessel 2235 are subjected to rinsing via spray nozzles 2270 and the drying by radiant heaters 2271 before being removed from the conveyor. The vessel 2235 is, moreover, resiliently mounted at 2224 and can be provided with a vibrator 2215 as previously described. At each end of the vessel 2235, there is provided an electrode 2217, 2218 connected with the machining current source 2219. Except for the fact that the workpieces are not permitted to move randomly in the system of FIG. 19, deburring takes place in the manner described in connection with FIG. 7.

Figure 20:
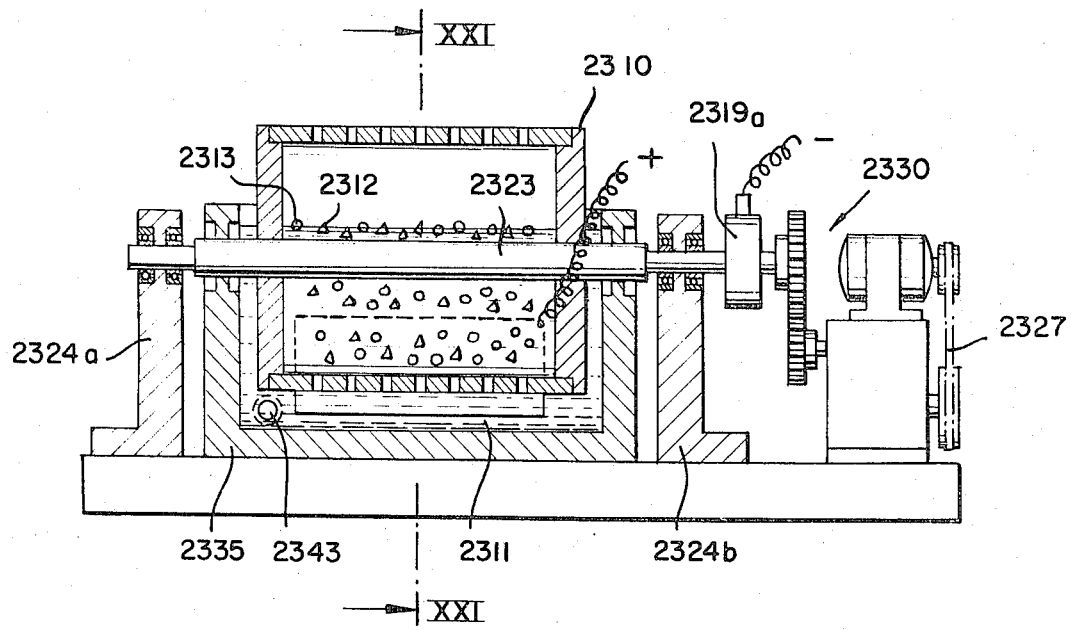
FIG. 20 is an axial cross-sectional view of a tumbling apparatus having another arrangement of the electrodes.
Figure 21:
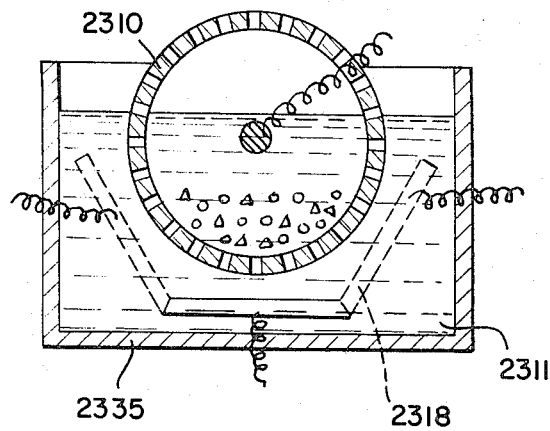
FIG. 21 is a cross section taken along the line XXI—XXI of FIG. 20.
Figures 22, 23:
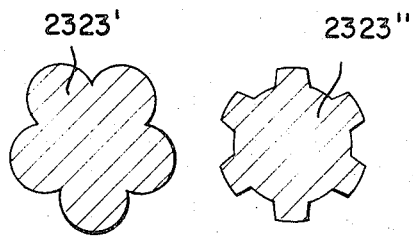
FIG. 22 is a cross-sectional view through one of the electrodes of FIGS. 20 and 21 in another embodiment.
FIG. 23 shows a modified electrode.

In FIGS. 20 and 21, I show a tumbling system in which the tumbling drum 2310 is rotated in an electrolyte bath 2311 in a receptable 2335. Here, as in FIG. 1, the drum 2310 receives the workpieces 2312 which are deburred against counterelectrodes formed by the conductive particles 2313. The perforations in the drum admit electrolyte from the vessel 2335 which has a drain 2343 from which electrolyte may be drawn for recycling as previously described. In this embodiment, journal blocks 2324a and 2324b rotatably support the shaft 2323 of the drum which is driven by a motor 2327 through a transmission 2330. The machining current source is connected to the shaft by a wiper 2319a so that the shaft constitutes one of the electrodes and extends through the body of electrolyte 2311 in the vessel. The counterelectrodes are provided as plates 2318 externally of the nonconductive drum. In this case, an axially extending electrode within the drum is provided with high surface area, the surface area being increased by imparting the configuration of either FIG. 22 or FIG. 23 thereto as shown at 2323' or 2323'', respectively. Here again, the system operates as previously set forth. Still another embodiment is shown in FIGS. 24–26 in which the drum 2410 is rotatable in the vessel 2435 and has a polygonal cross section to increase the tumbling action. The electrodes 2417 and 2418 are connected to the DC source 2419 by a polarity reversal switch 2419a controlled by a timer 2419b for polarity reversal every two seconds, for instance. The drum 2410, of course, includes the workpieces, conductive particles, electrolyte and any abrasive particles as already described. Since there is a possiblity of current leakage through the electrolyte 2411, I provide a barrier between the electrodes in the form of, for example, a rubber partition 2472 (FIG. 26) or an air-bubble curtain 2473 dispensed from a perforated compressed air tube 2474. In this embodiment, the shaft 2423 extends out of the housing and is driven by the motor 2427 via a belt transmission 2430.

The invention described and illustrated is believed to admit of many modifications within the ability of persons skilled in the art, all such modifications being considered within the spirit and scope of the appended claims.

I claim:

1. A method of deburring an electrolyte-soluble metallic workpiece, comprising the steps of:
    positioning said workpiece with at least one surface thereof in contact with an electrolyte;
    distributing in said electrolyte a multiplicity of conductive particles other than said workpiece and having a greater conductivity than that of said electrolyte;
    agitating said electrolyte in contact with said surface and imparting random movement to said particles relative to said workpiece;
    immersing a pair of electrodes in said electrolyte while generally maintaining said workpiece out of contact with said electrodes; and
    applying an electric current across said electrolyte between said electrodes to solubilize electrolytically portions of said surface with said particles functioning as counterelectrodes.

2. The method defined in claim 1 wherein said particles are composed at least in part of carbon.

3. The method defined in claim 2 wherein said particles contain abrasive granules incorporated therein.

4. The method defined in claim 2 wherein said electrolyte is agitated in contact with said surface by injecting a gas into said electrolyte.

5. The method defined in claim 1 further comprising the step of displacing said workpiece through said electrolyte during the electrolytic solubilization of portions of the surface thereof.

6. The method defined in claim 2 further comprising the step of distributing abrasive particles in said electrolyte.

7. The method defined in claim 1 further comprising the step of circulating said electrolyte past said surface to agitate said electrolyte in contact therewith.

8. The method defined in claim 1 wherein said workpiece is suspended from above in said electrolyte.

9. The method defined in claim 1 wherein said workpiece is displaced through said electrolyte along a predetermined path.

10. The method defined in claim 1 wherein said workpiece is displaced in said electrolyte in part to agitate the electrolyte in contact with the workpiece.

11. The method defined in claim 1 comprising the step of vibrating the electrolyte.

12. The method defined in claim 1 wherein said workpiece is:
    (a) a ferrous metal and said electrolyte consists of a composition selected from the group which consists of ($a_1$) 30 to 70% by weight sulfuric acid, 20 to 60% by weight glycerin, 0 to 2% by weight of at least one brightener, and the balance water, ($a_2$) 30 to 70% by weight sulfuric acid, 5 to 25% fluoboric acid, 0.5 to 1.5% oxalic acid, 0 to 2% by weight of at least one brightener, and the balance water, ($a_3$) 70 to 90% phosphoric acid, up to 10% by weight gelatine, 0 to 2% by weight of at least one brightener, and the balance water;
    (b) a copper-containing metal and said electrolyte consists essentially of 40 to 60% by weight sulfuric acid, 5 to 15% by weight acetic acid, 5 to 15% by weight chromic acid, 0 to 2% by weight of at least one brightener, and the balance water;
    (c) an aluminum-containing metal and said electrolyte consists essentially of 10 to 20% by weight sodium carbonate, 2 to 10% by weight sodium phosphate, 40 to 60% by weight phosphoric acid, 20 to 40% by weight glycerin, 1 to 5% fluoboric or ammonium boron fluoride, 0 to 2% of at least one brightener, and the balance water;
    (d) a tungsten-containing metal and said electrolyte consists essentially of 15 to 30% by weight nitric acid, 20 to 40% by weight hydrogen fluoride, 0 to 2% by weight of at least one brightener, and the balance phosphoric acid; or
    (e) a metal carbide and said electrolyte consists of 40 to 60% by weight ferric chloride, 0.5 to 2% by weight hydrogen chloride, 0 to 2% by weight of at least one brightener, and the balance nitric acid;

said brightener being selected from the group which consists of sodium oleate, sodium laurate, sodium palmitate, sodium stearate, sodium alkylsulfonates, and sodium alcoholic ester sulfates.

13. The method defined in claim 1 wherein said particles and said electrolyte constitute a system, said particles constituting the major fraction by volume of said system.

14. The method defined in claim 1 wherein the bulk volume ratio of said particles to the workpieces deburred therewith ranges between 1:1 and 20:1.

15. The method defined in claim 1 wherein said particles have a volume ranging between $\frac{1}{10}$ and 3 times that of said workpiece.

16. The method defined in claim 1 wherein said electrolyte is replenished in response to depletion thereof by decomposition and evaporation to maintain a substantially constant electrolyte proportion.

References Cited
UNITED STATES PATENTS

| | | | |
|---|---|---|---|
| 2,965,556 | 12/1960 | Damgaard | 204—140.5 |
| 2,385,198 | 9/1945 | Engle | 204—143 G |
| 3,061,708 | 10/1962 | Pfau | 219—69 |
| 2,390,282 | 12/1945 | Tour et al. | 204—140.5 |
| 3,272,729 | 9/1966 | Jumer | 240—140.5 |
| 3,533,928 | 10/1970 | Inone | 204—143 M |

THOMAS TUFARIELLO, Primary Examiner

U.S. Cl. X.R.

204—129.7, 213